United States Patent
Bulat et al.

(10) Patent No.: US 11,549,840 B2
(45) Date of Patent: Jan. 10, 2023

(54) VEHICLE FUEL VOLUME ESTIMATION SYSTEMS AND METHODS

(71) Applicant: Ford Global Technologies, LLC, Dearborn, MI (US)

(72) Inventors: Ben Bulat, Northville, MI (US); Hyongju Park, Ann Arbor, MI (US); Richard Gordon, Canton, MI (US); Arnold Babila, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 17/037,854

(22) Filed: Sep. 30, 2020

(65) Prior Publication Data

US 2022/0097515 A1    Mar. 31, 2022

(51) Int. Cl.
*G01F 25/00* (2022.01)
*B60K 15/03* (2006.01)
*G16Y 20/30* (2020.01)

(52) U.S. Cl.
CPC .......... *G01F 25/0084* (2013.01); *B60K 15/03* (2013.01); *B60K 2015/03197* (2013.01); *B60K 2015/03217* (2013.01); *B60K 2015/03361* (2013.01); *G16Y 20/30* (2020.01)

(58) Field of Classification Search
CPC ............ B60K 15/03; B60K 2015/0319; B60K 2015/03197; B60K 2015/03217; B60K 2015/03361; G01F 23/804; G16Y 20/30
USPC ............... 220/4.14, 561; 73/114.54
See application file for complete search history.

(56) References Cited

U.S. PATENT DOCUMENTS

| | | | | |
|---|---|---|---|---|
| 3,447,374 A | * | 6/1969 | Cohn | G01F 23/284 73/290 R |
| 3,984,934 A | | 10/1976 | Weiss et al. | |
| 4,840,056 A | * | 6/1989 | Fernandez | G01F 23/802 73/302 |
| 5,544,518 A | * | 8/1996 | Hart | G01F 25/20 73/1.73 |

(Continued)

FOREIGN PATENT DOCUMENTS

| | | |
|---|---|---|
| DE | 102009007532 A1 | 8/2010 |
| JP | 2011141161 A | 7/2011 |

OTHER PUBLICATIONS

GM Parts Giant (Online Automotive Parts Retailer); URL: https://www.gmpartsgiant.com/; published to the internet Jan. 2, 2011. GM Parts Giant is an online retailer that enabled finding car part specifications, including fuel tank assemblies, based on a Vehicle Identification Number (VIN). (Year: 2011).*

(Continued)

*Primary Examiner* — Sizo B Vilakazi
*Assistant Examiner* — Brian R Kirby
(74) *Attorney, Agent, or Firm* — Brandon Hicks; Eversheds Sutherland (US) LLP (57) ABSTRACT

Vehicle fuel volume estimation systems and methods are provided herein. An example method includes determining a fuel level percentage value for a vehicle, determining a vehicle identification number (VIN) of the vehicle, determining a fuel tank part number using the VIN, converting the fuel level percentage value into a fuel volume value based on the fuel tank part number, and transmitting a message to a recipient, the message that includes the fuel volume value.

13 Claims, 4 Drawing Sheets

(56) References Cited

U.S. PATENT DOCUMENTS

| | | | | |
|---|---|---|---|---|
| 6,459,969 B1* | 10/2002 | Bates | | G07C 5/006 370/401 |
| 6,615,656 B1* | 9/2003 | Breed | | G01F 23/36 177/136 |
| 6,892,572 B2* | 5/2005 | Breed | | B60J 10/00 73/1.73 |
| 6,907,371 B2* | 6/2005 | Klinger | | B60R 16/0232 702/100 |
| 7,206,720 B2 | 4/2007 | LaPant | | |
| 7,761,062 B2* | 7/2010 | Mervine | | G08G 1/205 455/99 |
| 9,528,872 B2 | 12/2016 | Stevenson et al. | | |
| 9,576,291 B2 | 2/2017 | Lamb et al. | | |
| 9,796,320 B2 | 10/2017 | McGuffin | | |
| 9,919,664 B2 | 3/2018 | Vucelic et al. | | |
| 10,140,785 B1 | 11/2018 | Cox et al. | | |
| 10,163,141 B2 | 12/2018 | Fansler et al. | | |
| 2001/0037298 A1* | 11/2001 | Ehrman | | G06Q 30/0645 705/40 |
| 2005/0108089 A1* | 5/2005 | Ehrman | | G06Q 30/0645 705/13 |
| 2008/0015908 A1* | 1/2008 | Ramseyer | | G07F 17/0014 701/29.6 |
| 2011/0288721 A1* | 11/2011 | Christensen | | B60L 53/305 701/29.5 |
| 2013/0013431 A1* | 1/2013 | Fansler | | G07F 13/025 705/18 |
| 2013/0232027 A1* | 9/2013 | Reich | | G06Q 30/0631 705/26.7 |
| 2013/0317693 A1* | 11/2013 | Jefferies | | B60R 25/24 701/31.5 |
| 2014/0195045 A1* | 7/2014 | McQuade | | G06F 21/44 700/237 |
| 2015/0106204 A1* | 4/2015 | Pudar | | G06Q 30/0261 705/14.58 |
| 2015/0112842 A1* | 4/2015 | Sieger | | G06Q 30/0627 705/26.63 |
| 2016/0078403 A1* | 3/2016 | Sethi | | G06Q 10/0875 705/26.81 |
| 2017/0046669 A1* | 2/2017 | Chow | | G06Q 10/0631 |
| 2017/0146975 A1* | 5/2017 | Clark | | G05B 19/41875 |
| 2018/0012204 A1* | 1/2018 | Shetty | | G07F 13/025 |
| 2019/0217851 A1* | 7/2019 | Light-Holets | | F02N 11/0818 |
| 2019/0376826 A1* | 12/2019 | Thomas | | G01F 23/24 |
| 2020/0193739 A1* | 6/2020 | Gintz | | G07C 5/008 |

OTHER PUBLICATIONS

"How to Find Car Parts Online"; URL: https://handymantips.org/find-car-parts-online/; published to the internet Jan. 31, 2018. Blog that discloses vehicle part numbers and part specifications may be determined based on a Vehicle Identification Number (VIN) (Year: 2018).*

"Chevy OnStar RemoteLink Demo" posted to YouTube Oct. 3, 2016 by "GottaBeMobile"; URL: https://www.youtube.com/watch?v=MiYrLQFThP4 (Year: 2016).*

"What is a Tank Strapping Chart"; journal article posted to the internet Jun. 21, 2019; Author Elisa Wilde; URL: https://www.apgsensors.com/about-us/blog/what-is-a-strapping-chart (Year: 2019).*

Eskilsson et al., "Fuel Level Estimation Methods—Master's thesis in Systems, Control and Mechatronics", Department of Electrical Engineering, Chalmers University of Technology, Gothenburg, Sweden 2018 (67 pages).

* cited by examiner

VEHICLE FUEL VOLUME ESTIMATION SYSTEMS AND METHODS

FIELD

The present disclosure is generally directed to systems and methods that determine a fuel volume based on empirical data, which can include fuel tank modeling and vehicle identification number analyses.

BACKGROUND

Generally, vehicles can utilize imprecise means, such as analog gauges, to measure fuel tank volume. While these devices generally provide an operator with a general fuel volume value, these fuel volume values are imprecise, which can lead to deleterious effects such as the vehicle running out of fuel unexpectedly. Moreover, even digital calculations of fuel volume are imprecise.

A lack of ability to accurately determine fuel volume can have implications in commercial arenas as well. Fuel reimbursements (or credits) are one of the largest operating costs for rental vehicle companies. Vehicles are sent out with a full tank of fuel, and rental customers are expected to return the vehicle with the same level of fuel. Today, rental companies lack the tools to objectively measure and track fuel volume, requiring personnel to manually read the fuel gauge and estimate fuel level in the vehicle to make a judgment as to the level of fuel. Under this process, customers may not be charged or are undercharged for fuel use, thus resulting in the rental companies losing revenue. Some customers drive a short distance, which does not register a change on the fuel gauge, and return the vehicle without refueling. Meanwhile, a subsequent renter may incur those incremental fuel charges which may prompt a credit request.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods that provide accurate and real-time fuel volume calculations for vehicles. Some vehicles are configured to determine a fuel level percentage value that is a gross estimate of a current fuel level remaining in a fuel tank of a vehicle. While these fuel level percentage values have some explanatory significance, they generally lack specificity and accuracy. These discrepancies can be due to variations in vehicle equipment, on a per model basis, in some instances. For example, the geometry of a fuel tank in a particular vehicle model may influence how fuel level percentage values compared to a vehicle of the same model, but with a different fuel tank geometry. These differences in vehicle equipment may lead to discrepancies in fuel level percentage value calculation. That is, fuel level percentage value estimator logic implemented in the vehicle may not account for these geometrical differences and may treat these two vehicles identically when calculating fuel level percentage values for each. Moreover, fuel level percentage values may not be a preferred format for some users as users are more accustomed to understanding fuel levels in terms of gallons or liters, which can further be interpreted by the user as an available distance that the vehicle can travel before needing to be refiled. For example, a fuel level percentage value of 15% may generally indicate that the user should refill soon, it is not as informative as knowing that the vehicle has 3.5 gallons of fuel, and that the vehicle has a fuel efficiency of 25 miles per gallon of fuel. Thus, converting the level percentage values to fuel volume values can be advantageous for the end user and more informative than a fuel level percentage value.

The systems and methods herein can be configured to use specific vehicle equipment data to accurately convert fuel level percentage values to fuel volume values. For example, the systems and methods can determine a fuel level percentage value for a vehicle from fuel level percentage value estimator logic of the vehicle, as well as determine a vehicle identification number (VIN) of the vehicle. The VIN is used to determine fuel tank part number for the specific VIN and select a fuel tank model. The fuel level percentage value can be converted into a fuel volume value based on the fuel tank model as identified by the fuel tank part number. A message can be transmitted to a recipient that includes the fuel volume value.

A fuel tank model can be created to correlate fuel level percentage values to fuel volume values which account for specific fuel tank geometries. Known amounts of fuel volume can be added to a fuel tank and correlating measurements of fuel level percentage values are determined to establish a fuel tank model. Other mappings can be created to correlate VIN numbers with fuel tank part numbers, fuel tank part numbers with fuel tank models, and so forth.

Illustrative Embodiments

Figure 1:
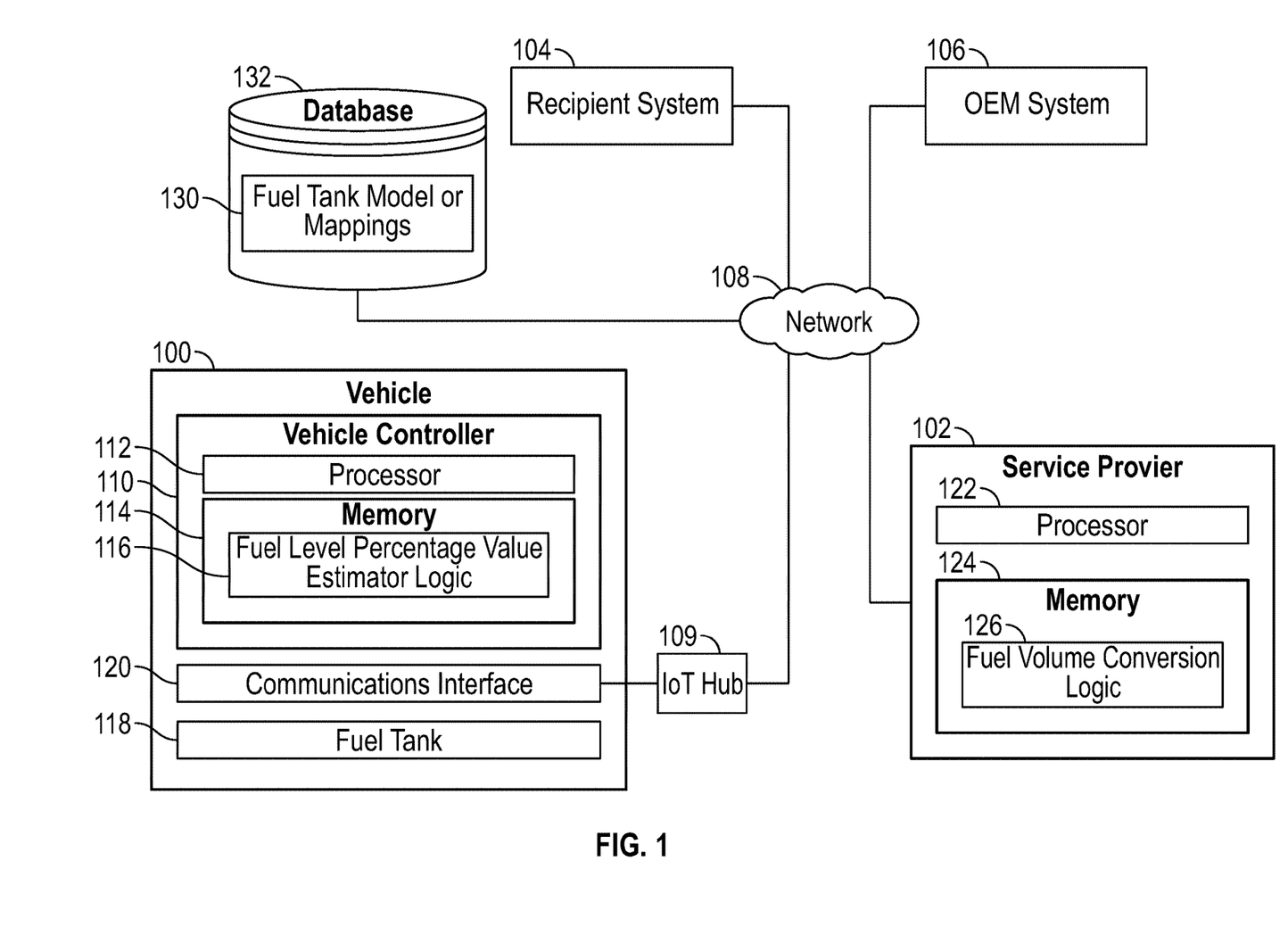
FIG. 1 depicts an illustrative architecture in which techniques and structures for providing the systems and methods disclosed herein may be implemented.

Turning now to the drawings, FIG. 1 depicts an illustrative architecture in which techniques and structures of the present disclosure may be implemented. A vehicle 100, a service provider 102, a recipient system 104, and an OEM (original equipment manufacturer) system 106 can be communicatively coupled through a network 108. The network 108 can include any public or private network such as Wi-Fi, cellular, or other long-range and/or short-range wireless network(s) or protocols. Each component of the architecture is configured to access the network 108 using any means that would be known to one of ordinary skill in the art.

The network 108 can include an IoT (Internet-of-Things) hub 109 that receives data from the vehicle 100 and forwards the data to the service provider 102. The recipient system 104 can query the service provider 102 of a real-time fuel volume value for the vehicle 100 over a secure application programming interface (API).

It will be understood that some aspects of the present disclosure may be performed at the vehicle level, the service provider level, and/or cooperatively vehicle level and the service provider level. In general, the vehicle 100 may have a vehicle controller 110 that can comprise a processor 112 and memory 114. The memory 114 stores instructions, such as implement fuel level percentage value estimator logic 116 that can be executed by the processor 112 to perform aspects of fuel level percentage value estimation. When referring to operations executed by the vehicle controller 110 it will be understood that this includes the execution of instructions by the processor 112. The vehicle controller 110 can utilize the fuel level percentage value estimator logic 116 to calculate a fuel level percentage of a fuel tank 118 in real-time. A fuel level percentage value can be displayed on a human machine interface of the vehicle 100 and/or can be transmitted to the service provider 102 for conversion into a fuel volume value. The vehicle 100 can also comprise a communications interface 120 to access the network 108.

The vehicle controller 110 can transmit a fuel level percentage value and a VIN number of the vehicle 100 to the service provider 102. The service provider 102 can use these values to convert the fuel level percentage value into a fuel volume value and provide the same to the recipient system 104.

In more detail, the service provider 102 can comprise a processor 122 and memory 124. The memory 124 stores instructions, such as implement fuel volume conversion logic 126 that can be executed by the processor 122 to perform aspects of fuel level percentage value to fuel volume conversion. When referring to operations executed by the service provider 102 it will be understood that this includes the execution of instructions by the processor 122. To be sure, the service provider 102 can be implemented as a physical or virtual server, or as an instance in a cloud environment.

Figure 2:
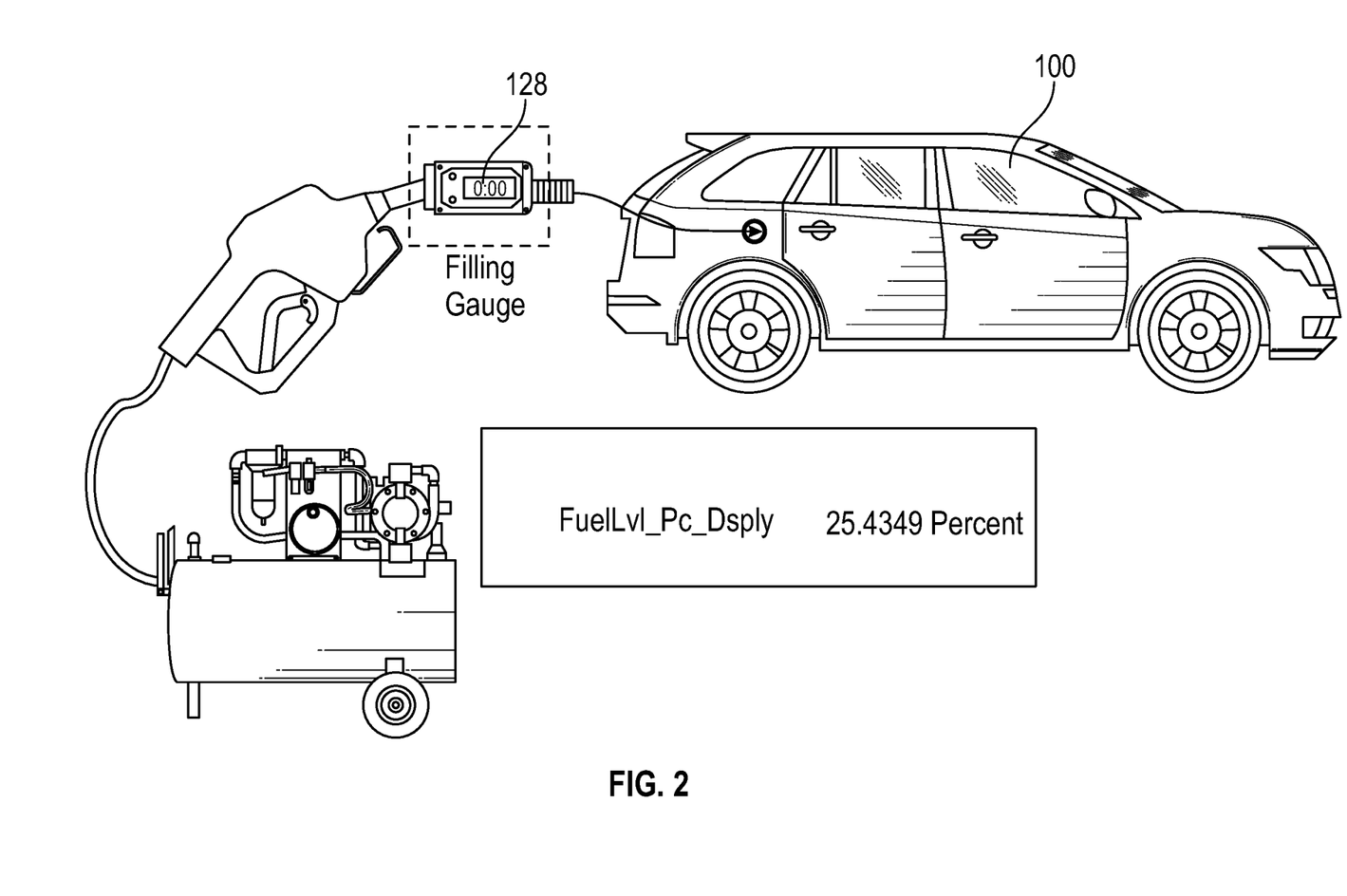
FIG. 2 schematically illustrates a process for creating a fuel tank model of a fuel tank of a vehicle.

Prior to providing fuel level percentage value to fuel volume conversion services, various mappings can be created and maintained by the service provider 102. Some mappings initially rely on fuel tank modeling processes. As noted generally above, fuel tank modeling can include a controlled process, as illustrated in FIG. 2, where a known volume of fuel is introduced into the fuel tank of the vehicle 100. As known volumes of fuel are introduced, a fuel level percentage value is obtained from the vehicle controller 110. The known volume of fuel can be determined using a filling gauge 128. A mapping or correlation can be created using this process where fuel level percentage values are mapped to fuel volume values. To be sure, this process can use a nonlinear model that can capture irregular shapes for each fuel tank application. That is, a specific fuel tank model can be established for each specific fuel tank part number. In some instances, the VIN can be used to obtain specific fuel tank parameters or other fuel system parameters that affect fuel storage of the fuel tank 118. These fuel tank parameters, such as geometry, can be used in the fuel tank modeling process.

Figure 3:
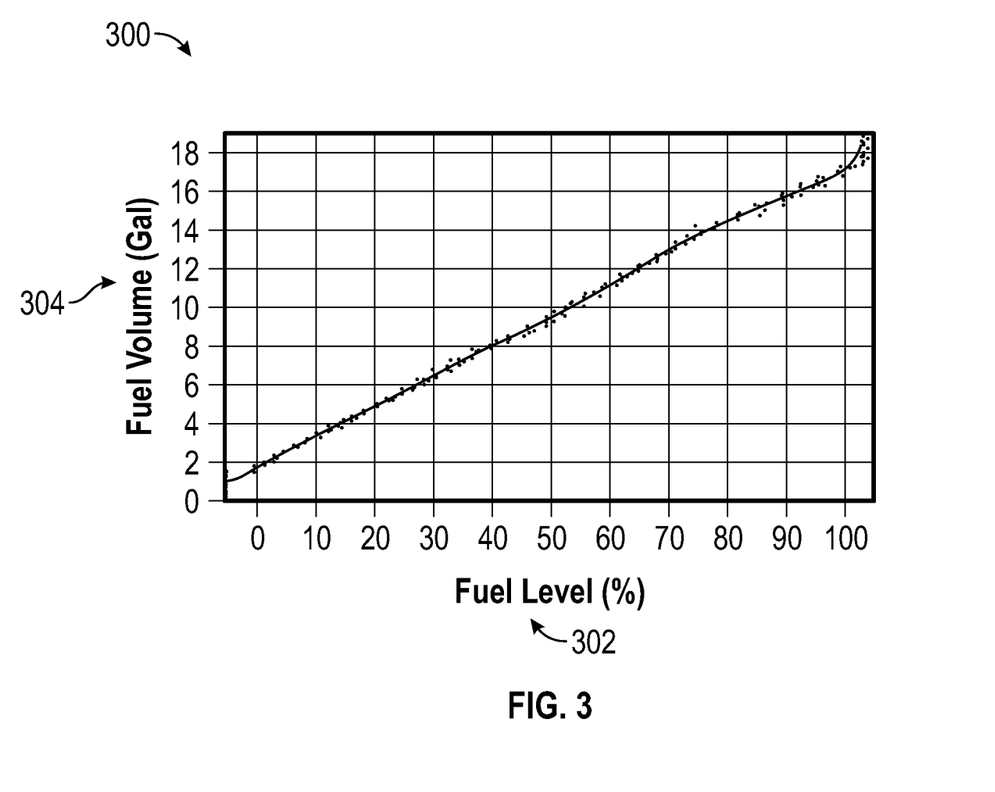
FIG. 3 is a graphical view of a fuel tank model of a fuel tank of a vehicle.

As noted above, each fuel tank can have a unique geometry and the geometry may affect calculations of fuel level percentage values. Empirical modeling of fuel tanks to correlate fuel level percentage values and fuel volume values can be used to reduce errors from this type of geometric variability. An example plot graph 300 is illustrated in FIG. 3, where fuel level percentage values 302 are correlated to fuel volume values 304.

The service provider 102 can maintain various fuel tank model or mappings 130 in a database 132. The service provider 102 can also maintain VIN to fuel tank part mappings the database 132. As discussed below, the VIN to fuel tank part number mappings can also be obtained from the OEM system 106 (or an equivalent information source).

Again, in an example use case, a particular model of vehicle, such as a Ford™ F-150 may have several levels of equipment options. Not all Ford™ F-150s have the same size or shape of fuel tank. Thus, errors in fuel level percentage values are introduced when a one-size-fits-all approach is taken. Specific fuel tank part numbers for the in fuel tank equipment can be assessed using a vehicle identification number (VIN) for the vehicle 100.

In general, the service provider 102 receives the VIN and fuel level percentage value from the vehicle controller 110. Using the VIN, the service provider 102 queries the OEM system 106 to determine a fuel tank part number that is associated with the vehicle 100 based on the VIN. Once the fuel tank part number has been identified, the service provider 102 obtains a fuel tank model or mapping 130 for the specific fuel tank part number stored in the database 132. Again, the fuel tank model includes specific fuel level percentage value to fuel volume value mappings that are specific to the fuel tank part number (and specific to the geometries of the fuel tank). The service provider 102 uses the fuel tank model or mapping to convert the fuel level percentage value to a fuel volume value. The fuel volume value can be transmitted in a message to the recipient system 104. The fuel volume value could also be displayed to the vehicle operator through a human machine interface. In an example calculation, the fuel level percentage value calculated by the vehicle controller 110 could include 36.765%, which would be converted to a fuel volume of 5.00 gallons by the service provider 102, as identified in the selected fuel tank model.

Figure 4:
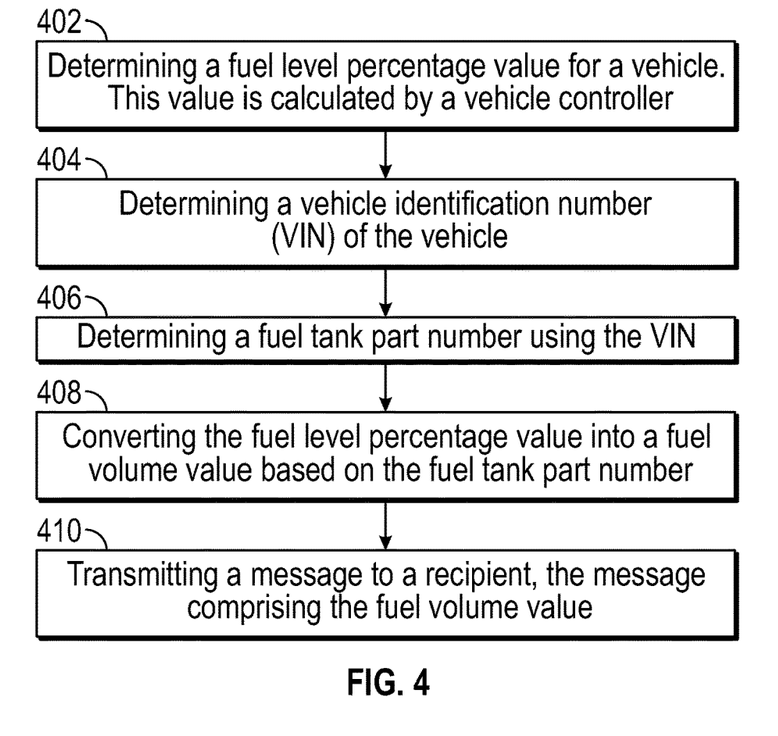
FIG. 4 is a flowchart of an example method of the present disclosure.

FIG. 4 is a flowchart of an example method of the present disclosure. The method includes a step 402 of determining a fuel level percentage value for a vehicle. This value is calculated by a vehicle controller. The fuel level percentage value can be determined from a message transmitted by the vehicle to a service provider. The method includes a step 404 of determining a vehicle identification number (VIN) of the vehicle. The VIN can be transmitted to the service provided by the vehicle controller. The VIN could also be obtained from the recipient system 104.

Next, the method includes a step 406 of determining a fuel tank part number using the VIN. As noted above, this can include interrogating or querying an OEM system for specific vehicle equipment part numbers using the VIN. The method includes a step 408 of converting the fuel level percentage value into a fuel volume value based on the fuel tank part number. In general, this process includes identifying a fuel tank model or mapping from the fuel tank part number and utilizing the fuel tank model or mapping in a lookup process. When the fuel volume value is obtained from the fuel tank model or mapping, the method can include a step 410 of transmitting a message to a recipient, the message comprising the fuel volume value.

For example, the recipient could include a vehicle rental service who desires to obtain a fuel volume calculation of a current or real-time fuel volume of a vehicle. Using the above-described method, the vehicle rental service can obtain current or real-time fuel volume of a vehicle from the service provider, which enables the vehicle rental service to make intelligent determinations about vehicle fuel levels and corresponding charges for vehicle renters.

As noted above, this method can include additional steps such as generating a first mapping table that comprises VIN numbers in association with fuel tank part numbers. The method can also include a step of generating a second mapping table that comprises fuel tank part numbers in association with fuel tank models. Each of the fuel tank models comprises correlations of fuel level percentages and fuel volume values.

Figure 5:
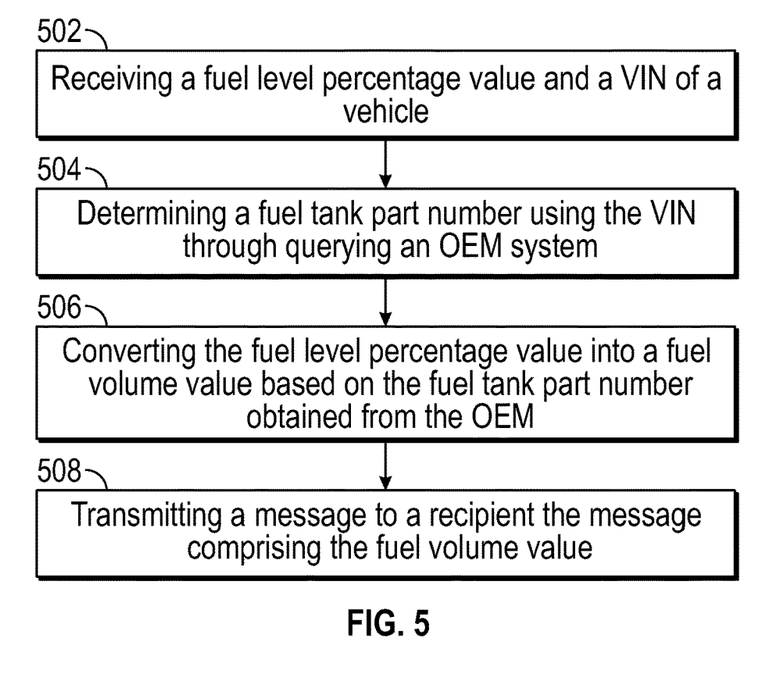
FIG. 5 is a flowchart of another example method of the present disclosure.

FIG. 5 is a flowchart of another example method. The method can include a step 502 of receiving a fuel level percentage value and a VIN of a vehicle. The method can also include a step 504 of determining a fuel tank part number using the VIN through querying an OEM system. The method can further include a step 506 of converting the fuel level percentage value into a fuel volume value based on the fuel tank part number, as well as a step 508 of transmitting a message to a recipient the message comprising the fuel volume value.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining a fuel level percentage value for a vehicle;
   determining a vehicle identification number (VIN) of the vehicle;
   determining a fuel tank part number using the VIN by at least:
      obtaining a first mapping table that comprises VIN numbers in association with fuel tank part numbers; and
      selecting, from the first mapping table and based on the VIN of the vehicle, the fuel tank part number;
   converting the fuel level percentage value into a fuel volume value based on the fuel tank part number by at least:
      obtaining a second mapping table that comprises fuel tank part numbers in association with fuel tank models;
      selecting, from the second mapping table and based on the fuel tank part number, a fuel tank model, wherein the fuel tank model comprises nonlinear correlations between fuel level percentages values and fuel volume values; and
      mapping the fuel level percentage value to the fuel volume level using the nonlinear correlations; and
   transmitting a message to a recipient, the message comprising the fuel volume value.

2. The method according to claim 1, further comprising: determining the nonlinear correlations by:
   introducing a known volume of fuel into a fuel tank of the vehicle, the fuel tank correlating to the fuel tank part number; and
   identifying the fuel level percentage value based on the known volume of fuel.

3. The method according to claim 2, further comprising determining fuel tank parameters of the fuel tank based on the fuel tank part number.

4. The method according to claim 3, wherein transmitting comprises streaming the fuel volume value to the recipient over an application programming interface.

5. A vehicle controller, comprising:
   a processor; and
   a memory for storing instructions, the processor executing the instructions to:
      determine a fuel level percentage value for a fuel tank of a vehicle;
      determine a vehicle identification number (VIN) of the vehicle;
      determine a fuel tank part number using the VIN by at least:
         obtaining a first mapping table that comprises VIN numbers in association with fuel tank part numbers; and
         selecting, from the first mapping table and based on the VIN of the vehicle, the fuel tank part number;
      determine a fuel tank model using the fuel tank part number by at least:
         obtaining a second mapping table that comprises fuel tank part numbers in association with fuel tank models; and
         selecting, from the second mapping table and based on the fuel tank part number, the fuel tank model for the fuel tank part number of the vehicle,
      wherein the fuel tank model comprises nonlinear correlations between fuel level percentages values and fuel volume values;
      convert the fuel level percentage value into a fuel volume value using the fuel tank model by at least mapping the fuel level percentage value to the fuel volume level using the nonlinear correlations; and
      transmit the fuel level percentage value to a recipient.

6. The vehicle controller to claim 5, wherein the processor executes the instructions to determine the nonlinear correlations between the fuel level percentage value and the fuel volume values for the fuel tank models by:
   introducing a known volume of fuel into the fuel tank of the vehicle, the fuel tank correlating to the fuel tank part number; and
   identifying the fuel level percentage value based on the known volume of fuel.

7. The vehicle controller according to claim 6, wherein the processor executes the instructions to determine fuel tank parameters of the fuel tank based on the fuel tank part number.

8. The vehicle controller according to claim 5, wherein the fuel level percentage value is transmitted over an application programming interface in real-time.

9. A system, comprising:
   a vehicle controller having a processor; and
   a memory for storing instructions, the processor executing the instructions to:

determine a fuel level percentage value for a fuel tank of a vehicle;
determine a vehicle identification number (VIN) of the vehicle; and a service provider having a processor; and a memory for storing instructions, the processor executing the instructions to:
receive the fuel level percentage value and the VIN;
determine a fuel tank part number using the VIN by at least:
  obtaining a first mapping table that comprises VIN numbers in association with fuel tank part numbers; and
  selecting, from the first mapping table and based on the VIN of the vehicle, the fuel tank part number;
convert the fuel level percentage value into a fuel volume value based on the fuel tank part number by at least:
  obtaining a second mapping table that comprises fuel tank part numbers in association with fuel tank models;
  selecting, from the second mapping table and based on the fuel tank part number, a fuel tank model, wherein the fuel tank model comprises nonlinear correlations between fuel level percentages values and fuel volume values; and
  mapping the fuel level percentage value to the fuel volume level using the nonlinear correlations; and
transmit a message to a recipient, the message comprising the fuel volume value.

10. The system to claim 9, wherein the service provider is configured to determine the nonlinear correlations between the fuel level percentage value and the fuel volume values for the fuel tank models by:
  introducing a known volume of fuel into the fuel tank of the vehicle, the fuel tank correlating to the fuel tank part number; and
  identifying the fuel level percentage value based on an addition of the known amount of fuel.

11. The system according to claim 10, wherein the service provider is configured to determine fuel tank parameters of the fuel tank based on the fuel tank part number, and wherein the fuel level percentage value is transmitted by the service provider to a rental service over an application programming interface in real-time.

12. The system according to claim 10, wherein the recipient comprises a vehicle rental service.

13. The system according to claim 9, wherein the vehicle transits the fuel level percentage value and the VIN to an Internet-of-Things (IOT) hub that forwards the fuel level percentage value and the VIN to the service provider.

* * * * *